United States Patent
Agirman

(10) Patent No.: US 10,944,335 B2
(45) Date of Patent: Mar. 9, 2021

(54) PARALLELED PASSIVE FRONT-END RECTIFIERS WITH AND WITHOUT INTERLEAVING

(71) Applicant: Carrier Corporation, Palm Beach Gardens, FL (US)

(72) Inventor: Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/480,529

(22) PCT Filed: Jan. 26, 2018

(86) PCT No.: PCT/US2018/015473
§ 371 (c)(1),
(2) Date: Jul. 24, 2019

(87) PCT Pub. No.: WO2018/140744
PCT Pub. Date: Aug. 2, 2018

(65) Prior Publication Data
US 2019/0379297 A1    Dec. 12, 2019

Related U.S. Application Data

(60) Provisional application No. 62/452,150, filed on Jan. 30, 2017.

(51) Int. Cl.
*H02M 7/493* (2007.01)
*H02M 1/00* (2006.01)
*H02P 27/08* (2006.01)

(52) U.S. Cl.
CPC ......... *H02M 7/493* (2013.01); *H02M 1/0061* (2013.01); *H02P 27/08* (2013.01); *H02M 2001/0003* (2013.01)

(58) Field of Classification Search
CPC ............... H02M 7/493; H02M 1/0061; H02M 2001/0003; H02P 27/08; H02P 27/04; H02P 21/00
See application file for complete search history.

(56) References Cited

U.S. PATENT DOCUMENTS 3,792,286 A    2/1974 Meier
3,902,073 A    8/1975 Lafuze
(Continued)

FOREIGN PATENT DOCUMENTS

CN    101359896 A    2/2009
CN    102132480 A    7/2011
(Continued)

OTHER PUBLICATIONS

International Search Report for application PCT/US2018/015473, dated Apr. 11, 2018, 12 pages.
(Continued)

*Primary Examiner* — Adolf D Berhane
(74) *Attorney, Agent, or Firm* — Cantor Colburn LLP

(57) ABSTRACT

Embodiments herein relate to a three-phase paralleled passive front-end drive, that includes a rectifier bridge, a coupling reactance operably connected to the rectifier bridge and configured to transfer power from the rectifier to a first direct current (DC) bus, and a bus coupler operably coupling the first DC bus to a second DC bus. The paralleled drive also includes a first inverter operably connected to the first DC bus; a second inverter operably connected the second DC bus, the first inverter and second the inverter each configured to provide a plurality of motor excitation signals, respectively. The paralleled drive also includes a plurality of interphase inductors operable to combine the plurality of
(Continued)

motor excitation signals from the first inverter with the plurality of motor excitation signals from the second inverter.

18 Claims, 8 Drawing Sheets

(56) References Cited

U.S. PATENT DOCUMENTS

| | | | |
|---|---|---|---|
| 3,958,173 A | 5/1976 | Christianson et al. | |
| 4,349,772 A | 9/1982 | Weiss | |
| 4,802,079 A | 1/1989 | Mizoguchi | |
| 5,016,158 A | 5/1991 | Matsui et al. | |
| 5,130,561 A | 7/1992 | Elliott et al. | |
| 5,191,518 A | 3/1993 | Recker et al. | |
| 5,193,054 A | 3/1993 | Galloway et al. | |
| 5,245,525 A | 9/1993 | Galloway et al. | |
| 5,253,155 A | 10/1993 | Yamamoto | |
| 5,390,102 A | 2/1995 | Araki | |
| 5,434,771 A | 7/1995 | Danby et al. | |
| 5,436,823 A | 7/1995 | Araki | |
| 5,450,309 A | 9/1995 | Rohner | |
| 5,499,178 A | 3/1996 | Mohan | |
| 5,515,264 A | 5/1996 | Stacey | |
| 5,657,217 A | 8/1997 | Watanabe et al. | |
| 5,852,554 A | 12/1998 | Yamamoto | |
| 5,903,066 A | 5/1999 | Enjeti et al. | |
| 5,905,642 A | 5/1999 | Hammond | |
| 5,910,892 A | 6/1999 | Lyons et al. | |
| 6,075,717 A * | 6/2000 | Kumar | H02M 5/4505 363/128 |
| 6,788,559 B2 | 9/2004 | Sheng et al. | |
| 7,068,525 B2 | 6/2006 | Kraus et al. | |
| 7,102,343 B1 | 9/2006 | Brown | |
| 7,109,681 B2 | 9/2006 | Baker et al. | |
| 7,110,266 B1 | 9/2006 | Porter et al. | |
| 7,327,588 B2 | 2/2008 | Ollila | |
| 7,667,351 B2 | 2/2010 | Marwali et al. | |
| 7,738,267 B1 | 6/2010 | Tallam et al. | |
| 7,773,396 B2 | 8/2010 | Ollila et al. | |
| 7,825,726 B2 | 11/2010 | Midya et al. | |
| 7,872,885 B2 | 1/2011 | Itkonen et al. | |
| 8,107,267 B2 | 1/2012 | Tallam et al. | |
| 8,188,694 B2 | 5/2012 | Tallam et al. | |
| 8,487,568 B2 | 7/2013 | Franke | |
| 8,710,782 B2 | 4/2014 | Tallam et al. | |
| 8,787,048 B2 | 7/2014 | Moreno-Casta et al. | |
| 8,841,872 B2 | 9/2014 | Pasuri et al. | |
| 9,024,563 B2 | 5/2015 | Bunte et al. | |
| 9,093,986 B2 | 7/2015 | O'Malley et al. | |
| 9,257,934 B2 | 2/2016 | Hamada et al. | |
| 9,654,021 B2 | 5/2017 | Wei et al. | |
| 9,906,183 B1 * | 2/2018 | Agirman | H02M 5/4585 |
| 2004/0182652 A1 | 9/2004 | Ammon et al. | |
| 2005/0077886 A1 * | 4/2005 | Cester | H02M 5/272 323/355 |
| 2006/0043922 A1 | 3/2006 | Baker et al. | |
| 2011/0235376 A1 | 9/2011 | Feng et al. | |
| 2011/0314875 A1 | 12/2011 | Albayrak et al. | |
| 2013/0121041 A1 | 5/2013 | Schroeder et al. | |
| 2013/0234641 A1 | 9/2013 | Li et al. | |
| 2014/0035498 A1 | 2/2014 | Harbourt et al. | |
| 2014/0145658 A1 | 5/2014 | Heo et al. | |
| 2015/0098257 A1 | 4/2015 | Wei et al. | |
| 2016/0329811 A1 | 11/2016 | Du et al. | |
| 2019/0006951 A1 * | 1/2019 | Huggenberger | B60L 9/28 |
| 2019/0199086 A1 * | 6/2019 | Li | H02M 7/003 |
| 2019/0379297 A1 | 12/2019 | Agirman | |
| 2019/0393801 A1 * | 12/2019 | Agirman | H02M 7/493 |

FOREIGN PATENT DOCUMENTS

| | | |
|---|---|---|
| EP | 0524398 A2 | 1/1993 |
| EP | 0600635 A2 | 6/1994 |
| EP | 2950434 A1 | 12/2015 |
| JP | S6328274 A | 2/1988 |
| JP | S5722385 A | 3/2006 |
| JP | 2009050063 A | 3/2009 |
| WO | 2014125445 A2 | 8/2014 |
| WO | 2015094233 A1 | 6/2015 |
| WO | 2015108614 A1 | 7/2015 |
| WO | 2016100026 A1 | 6/2016 |
| WO | 2016126782 A1 | 8/2016 |

OTHER PUBLICATIONS

Chinese First Office Action for application CN 201580068990.5, dated Jul. 23, 2019, 6 pages.
European Search Report for application EP 181538853.1, dated Jun. 14, 2018, 12 pages.
Non Final Office Action for U.S. Appl. No. 16/480,589, dated Jul. 24, 2019, 28 pages.
Balasubramani, S. et al., "Parallel Connected 12 Pulse Rectifier using Inter Phase Transformer", Indian Journal of Science and Technology, vol. 8(32), Nov. 2015, 4 pages.
Bhide, R. S., et al., "Analysis of Parallel Operation of Converters with Interphase Transformer", Proceedings of India International Conference on Power Electronics 2006, 4 pages.
European Search Report for EP 18153885, dated Jun. 14, 2018, 12 pages.
International Search Report for application PCT/US2018.015492, dated Jun. 7, 2018, 16 pages.
Laka, Aitor et al., "Parallelization of Two Three-Phase Converters by USing Coupled Inductors Built on a Single Magnetic Core", University of Mondragon, Przeglad Elektrotechniczny, 2013, 5 pages.
Notice of Allowance U.S. Appl. No. 15/419,670, dated Oct. 25, 2017, 13 pages.
Schoroder, Stefan, et al., "Modular High-Power Shunt-Interleaved Drive System: A Realization Up to 35 MW for Oddil and Gas Applications", IEEE Transactions on Industry Applications May 2010, vol. 46, No. 2, 821-830 pages.
Zhang, Di, et al., "Common-Mode Circulating Current Control of Paralleled Interleaved Three-Phase Two-Level Voltage-Source Converters with Discontinuous Space-Vector Modulation", IEEE Transactions on Power Electronics vol. 26, No. 12, Dec. 1, 2011, 11 pages.

* cited by examiner

PARALLELED PASSIVE FRONT-END RECTIFIERS WITH AND WITHOUT INTERLEAVING

TECHNICAL FIELD

The subject matter disclosed herein relates generally to the field of motor drives, and more particularly to a motor drive for elevators and HVAC/R chiller systems.

BACKGROUND

An elevator system, such as traction, hydraulic, and self-propelled elevator systems, based on the application (e.g., high rise buildings) can utilize a power system to propel a car within an elevator shaft. Large chiller systems utilize a power system to drive compressors and fan systems. At present, the power systems can employ active or passive rectifiers to generate a DC bus and then an inverter scheme to drive the motors. This is done to improve performance of the power system in particular for variable speed or variable capacity systems. However, timing and switching a power from the rectifiers to a direct current (DC) bus includes inherent electromagnetic interference (EMI) problems. Likewise timing and switching of power in an inverter generates significant EMI.

In general, EMI noise can be divided into two major groups: differential mode (DM) noise and common-mode (CM) noise. DM noises are conducted between phases. CM noises are conducted together with all phases through the parasitic capacitors to the ground. CM noises are with serious concern for motor drives because CM noises increase the EMI in the motor drive and damage the motor bearing and winding insulation. Unfortunately, in certain applications, solutions such as adding CM filters to attenuate CM noises are not viable due to the significant weight penalty of each CM filter.

Conveyance systems, such as elevator systems, use machines to impart force to a car carrying passengers. Chiller systems use large machines to operate large compressors. The machines employed may need to provide varying power levels depending on the application. When either an elevator system or a chiller system requires a large duty or load, a motor drive needs to be provided to power the machine. Often, a high power drive may not exist, which results in high design costs and lengthy development time to manufacture a suitable drive. Even if a single, large drive exists in the marketplace, costs associated with a single, large drive may be excessive due to specialty components, component availability, etc. Also, high power drives commonly require expensive high voltage components. Therefore, paralleling drives may provide a more cost effective approach.

BRIEF DESCRIPTION

According to one embodiment of the invention, described herein is a three-phase paralleled passive front-end drive. The three-phase paralleled front end drive including a rectifier bridge configured for connection to a three phase alternating current power source, a coupling reactance operably connected to the rectifier bridge and configured to transfer power from the rectifier to a first direct current (DC) bus, and a bus coupler operably coupling the first DC bus to a second DC bus. The three-phase paralleled front end drive also includes a first inverter operably connected to the first DC bus, a second inverter operably connected the second DC bus, the first inverter and second the inverter each configured to provide a plurality of motor excitation signals, a first controller operably connected to the first inverter and the second inverter, the controller configured to generate control signals to cause the first inverter and the second inverter to generate a plurality of motor excitation signals respectively, and a plurality of interphase inductors operable to combine the plurality of motor excitation signals from the first inverter with the plurality of motor excitation signals from the second inverter.

In addition to one or more of the features described above, or as an alternative, further embodiments may include a second rectifier bridge and a second coupling reactance operably connected to the second rectifier bridge and configured to transfer power from the rectifier bridge to a direct current (DC) bus. Moreover, in any of the above embodiments, or in the alternative, the three-phase paralleled passive front-end further including that the second coupling reactance includes two series inductors and a parallel capacitor to stabilize the second DC bus.

In addition to one or more of the features described above, or as an alternative, further embodiments may include a second controller wherein the first controller and the second controller implement a method to cause the first inverter and the second inverter to provide substantially equal motor excitation currents respectively.

In addition to one or more of the features described above, or as an alternative, further embodiments may include that the first coupling reactance includes two series inductor and a parallel capacitor to stabilize the first DC bus.

In addition to one or more of the features described above, or as an alternative, further embodiments may include that the first or the second coupling reactance is configured to control a circulation current of the three-phase paralleled passive front-end drive.

In addition to one or more of the features described above, or as an alternative, further embodiments may include that the first inverter and the second inverter comprise at least six switching devices.

In addition to one or more of the features described above, or as an alternative, further embodiments may include that each interphase inductor includes a pair of windings and is configured to control a circulation current of the three-phase paralleled passive front-end drive.

In addition to one or more of the features described above, or as an alternative, further embodiments may include that the controller is configured to implement a method to cause the first inverter and the second inverter to provide substantially equal motor excitation currents respectively.

According to another embodiment of the invention, described herein is motor control system with a three-phase paralleled passive front-end drive. The motor control system including a rectifier bridge configured for connection to a three phase alternating current power source, a coupling reactance operably connected to the rectifier bridge and configured to transfer power from the rectifier to a first direct current (DC) bus, and a bus coupler operably coupling the first DC bus to a second DC bus. The motor control system also including a first inverter operably connected to the first DC bus, a second inverter operably connected the second DC bus, the first inverter and second the inverter each configured to provide a plurality of motor excitation signals, a first controller operably connected to the first inverter and the second inverter, where the controller is configured to generate control signals to cause the first inverter and the second inverter to generate a plurality of motor excitation signals respectively. The motor control system also includes a plurality of interphase inductors operable to combine the plurality of motor excitation signals from the first inverter with the plurality of motor excitation signals from the second inverter to form a plurality of combined motor excitation signals; and a motor operably connected to the plurality of interphase inductors, the motor configured to receive the plurality of combined motor excitation signals.

In addition to one or more of the features described above, or as an alternative, further embodiments may include a second rectifier bridge and a second coupling reactance operably connected to the second rectifier bridge and configured to transfer power from the rectifier bridge to a direct current (DC) bus.

In addition to one or more of the features described above, or as an alternative, further embodiments may include that the second coupling reactance includes two series inductors and a parallel capacitor to stabilize the second DC bus.

In addition to one or more of the features described above, or as an alternative, further embodiments may include a second controller wherein the first controller and the second controller implement a method to cause the first inverter and the second inverter to provide substantially equal motor excitation currents respectively.

In addition to one or more of the features described above, or as an alternative, further embodiments may include that the first coupling reactance includes two series inductor and a parallel capacitor to stabilize the first DC bus.

In addition to one or more of the features described above, or as an alternative, further embodiments may include that the first or the second coupling reactance is configured to control a circulation current of the three-phase paralleled passive front-end drive.

In addition to one or more of the features described above, or as an alternative, further embodiments may include that each interphase inductor includes a pair of windings and is configured to control a circulation current of the three-phase paralleled passive front-end drive.

In addition to one or more of the features described above, or as an alternative, further embodiments may include that the controller is configured to implement a method to cause the first inverter and the second inverter to provide substantially equal motor excitation currents respectively.

According to yet another embodiment described herein is a building system having motor control system with a three-phase paralleled passive front-end drive. The building system including a rectifier bridge configured for connection to a three phase alternating current power source, a coupling reactance operably connected to the rectifier bridge and configured to transfer power from the rectifier to a first direct current (DC) bus, and a bus coupler operably coupling the first DC bus to a second DC bus. The building system also including a first inverter operably connected to the first DC bus, a second inverter operably connected the second DC bus, the first inverter and second the inverter each configured to provide a plurality of motor excitation signals, and a first controller operably connected to the first inverter and the second inverter, the controller configured to generate control signals to cause the first inverter and the second inverter to generate a plurality of motor excitation signals respectively. The building system also includes a plurality of interphase inductors operable to combine the plurality of motor excitation signals from the first inverter with the plurality of motor excitation signals from the second inverter to form a plurality of combined motor excitation signals; and a motor operably connected to the plurality of interphase inductors, the motor configured to receive the plurality of combined motor excitation signals from the interphase inductors, wherein the motor is operatively coupled to a drive element of the building system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
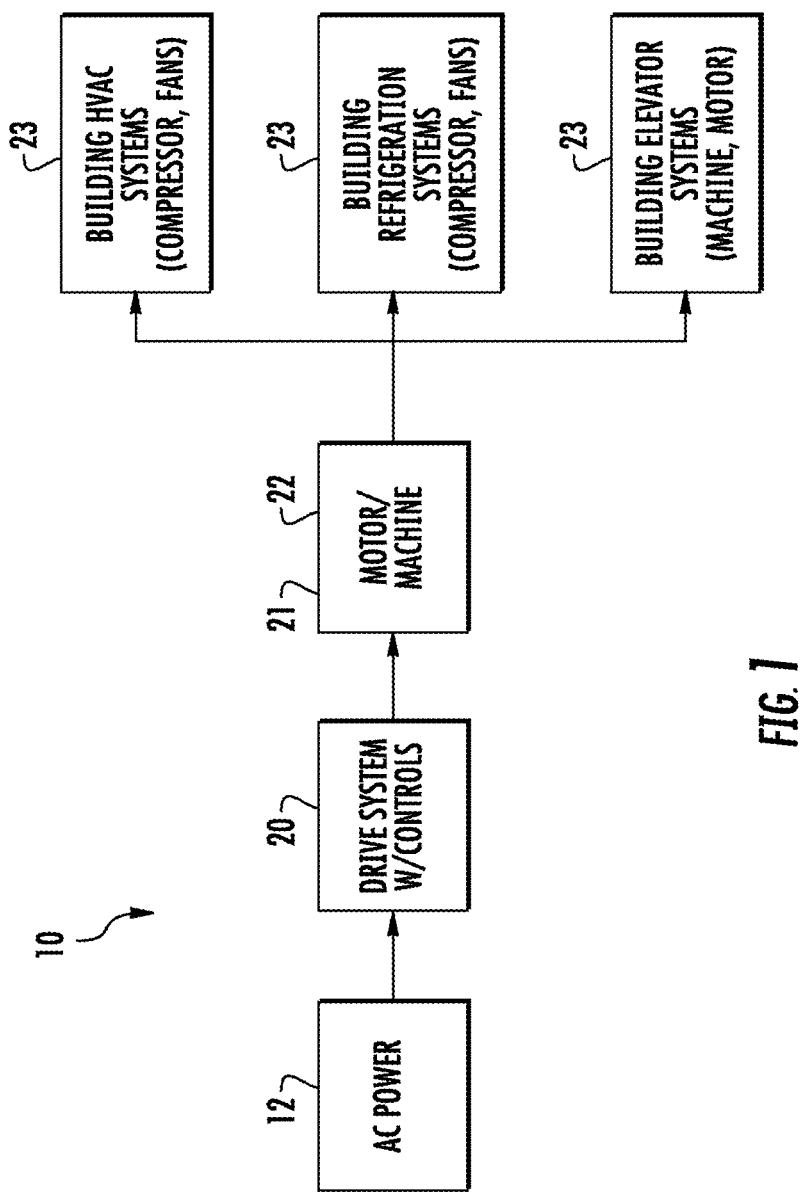
FIG. 1 depicts a power system for a building system in accordance with an embodiment.

In general, embodiments herein relate to a rectifier to supply a DC bus that in turn supplies voltage to a converter that drives a motor and configuring the rectifier to minimize or eliminate common mode noise between a direct current (DC) bus and an alternating current (AC) source. In this way, the embodiments herein relate to timing and switching a power from the rectifier to the DC bus. Embodiments herein set forth a drive and motor system and/or method for a rectifier system (e.g., a three-phase passive front-end rectifier) to actively control a DC voltage, an AC side sinusoidal current, and a power factor by fast switching of power electronics devices.

Generally, the switching of power electronics devices in passive front-end rectifier also brings electromagnetic interference (EMI) problems. EMI filters are designed to attenuate EMI noise to satisfy the EMI standards, which are defined for particular applications, but EMI filters add weight and complexity for the rectifier system. Further, a more complex topology for an active front-end rectifier can be applied to further reduce the CM voltage. For example, paralleled active rectifiers have more control freedoms than the standard two-level rectifier. However active front-end rectifiers are more complex. Thus, the three-phase passive front-end rectifier with and without interleaving provides a PWM method to achieve reduced CM-voltage for paralleled rectifiers and inverters that is simpler and more cost effective.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In one embodiment, the three-phase passive front-end rectifier is utilized in a power system of a building heating ventilation and air conditioning or refrigeration system (HVAC/R). For example, a building HVAC/R can employ a chiller system driven by a power system including a motor drive with rectifier and inverter as described herein In some instances the rectifier may be a three-phase passive front-end rectifier. In an embodiment a passive rectifier with and without interleaving is disclosed. The drive may also include a power electronics inverter (e.g., as a variable speed alternating current (AC) motor drive) to improve the performance of the chiller system.

In another embodiment, the three-phase passive front-end rectifier is utilized in an electric motor system 23 of an elevator system. The elevator system also includes a hoistway having a plurality of lanes or shafts. In each shaft, one or more elevator car travels to deliver passengers to a desired floor of a building. The electric motor system utilizes the power electronics inverter (e.g., as variable speed alternating drive (AC) motor drive) to improve the performance of maneuvering the elevator cars. Other applications and embodiments of the three-phase passive front-end rectifier include powers systems for trains, boats, planes, etc.

FIG. 1 is a block diagram of components of a power system 10 of an embodiment as may be employed to power one or more building systems or loads 23. In an embodiment the power system 10 is described with respect to an HVAC/R system. The conventional HVAC/R system incorporates a closed refrigerant loop in a vapor compression cycle. The vapor-compression cycle uses a circulating refrigerant as the medium which absorbs and removes heat from the space to be cooled and subsequently rejects that heat elsewhere. All such systems have four basic components: a compressor, a condenser, a thermal expansion valve (also called a throttle valve or metering device), and an evaporator. Circulating refrigerant enters the compressor as a saturated vapor and is compressed to a higher pressure, resulting in a higher temperature as well. The hot, compressed vapor is then in the thermodynamic state known as a superheated vapor and it is at a temperature and pressure at which it can be condensed with either cooling water or cooling air flowing across the coil or tubes in the condenser. This is where the circulating refrigerant rejects heat from the system and the rejected heat is carried away by either the water or the air (whichever may be the case). The condensed liquid refrigerant, in the thermodynamic state known as a saturated liquid, is next routed through an expansion valve where it undergoes an abrupt reduction in pressure. That pressure reduction results in the flash evaporation of a part of the liquid refrigerant. The evaporation lowers the temperature of the liquid and vapor refrigerant mixture to where it is colder than the temperature of the enclosed space to be refrigerated.

The cold mixture is then routed through the coil or tubes in the evaporator. A fan circulates the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space to the desired temperature. The evaporator is where the circulating refrigerant absorbs and removes heat which is subsequently rejected in the condenser and transferred elsewhere by the water or air used in the condenser. To complete the refrigeration cycle, the refrigerant vapor from the evaporator is again a saturated vapor and is routed back into the compressor. In large scale HVAC systems or chillers, the compressor is large and driven by a very large motor requiring dedicated motor drives with high voltage and current capabilities.

Figure 2:
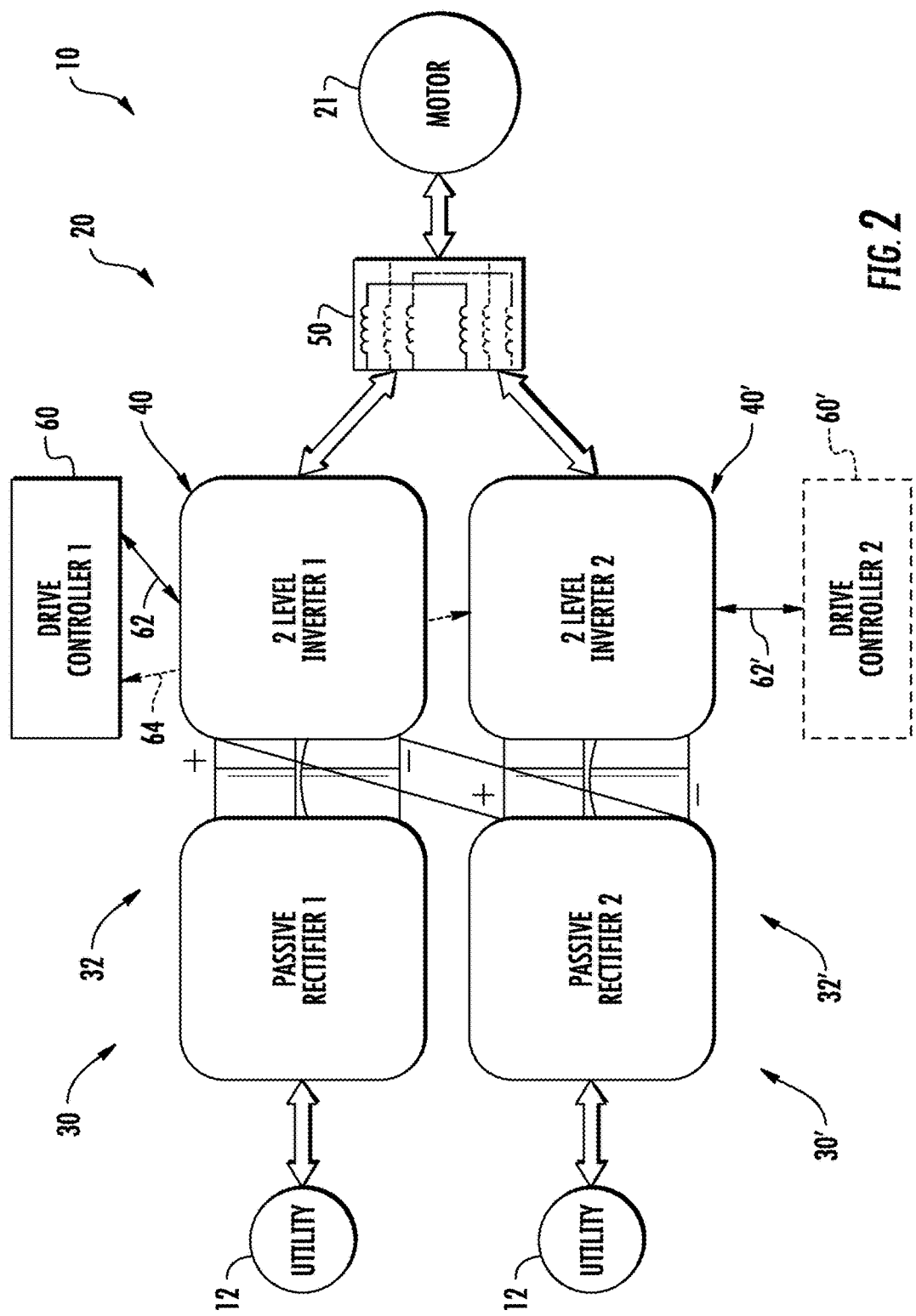
FIG. 2 shows a block diagram of three-phase paralleled drive in accordance with an embodiment.

Although some embodiments are described with respect to an HVAC system, it is understood that embodiments may be applied to other systems with large motor controls. Further, the embodiments are directed and described with respect to elevator systems, but again may be applied to other conveyance systems (e.g., trains, automobiles, marine). Turning now to FIG. 2 as well, power system 10 includes a source of AC power 12, such as an electrical main line (e.g., 440 volt, 3-phase). The AC power 12 is provided to a motor drive system 20. As described in further detail herein, drive system 20 includes a plurality of drives arranged in a parallel electrical configuration. Each drive system 20 may include a rectifier 32, 32' or converter to convert the AC power 12 to a DC voltage. Each drive system 20 may include an inverter 40, 40' to convert the DC voltage to multiphase, AC drive signals to drive a machine 22 (shown in FIG. 1). Drive signals from the drive system 20 are supplied to the machine 22 to operate the load 23. For example, turn a compressor or impart motion to elevator car. In an exemplary embodiment, machine 22 includes a multiphase, permanent magnet synchronous motor 21.

As shown in FIG. 2, the drive system 20 includes paralleled drives 30 and 30' in an embodiment. The two drives 30, 30' include a passive rectifier 32, 32' and an inverter 40, and 40' connected in parallel to provide drive signals to motor 21. In an embodiment both inverters 40, 40' are controlled by a controller 60. In an alternative embodiment each inverter 40 and 40' is controlled by a separate drive controller, 60 and 60', respectively. Drive controllers 60 and 60' provide control signals 62, 62', 64 to the inverters 40 and 40', respectively, to control generation of the drive signals to motor 21. Drive controllers 60, 60' may be implemented using a general-purpose microprocessor executing a computer program stored on a storage medium to perform the operations described herein. Alternatively, drive controllers 60, 60' may be implemented in hardware (e.g., ASIC, FPGA) or in a combination of hardware/software.

Figure 3:
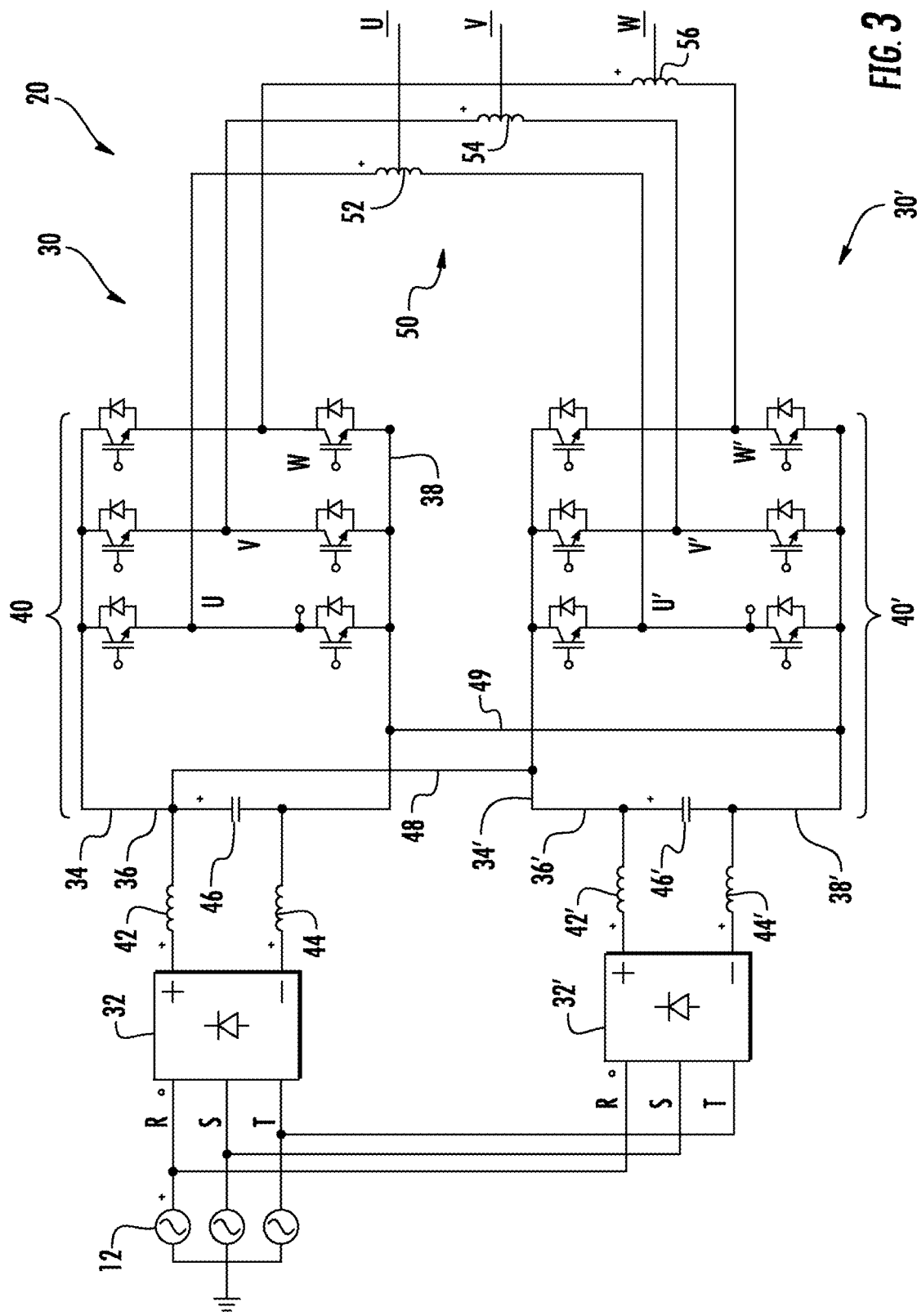
FIG. 3 illustrates a simplified schematic of passive rectifier paralleled drive in accordance with an embodiment.

Each drive 30 and 30' is 2 level, 3 phase drives, such as that shown in FIG. 3. Drives 30 and 30' are placed in parallel by electrically connecting the positive DC bus of each drive 30 and 30' as will be described in further detail herein. The 3 phase drive signals from drives 30 and 30' are connected to an inductive interface 50, which combines each respective phase from the drives 30 and 30' through inductive elements 52, 54, 56 (e.g., inductors). Inductive interface 50 allows for combining phases from two separate drives 30 and 30'. Inductive interface 50 also acts as a voltage suppression filter. In an embodiment, the inductive interface 50 is one or more interphase inductors. Interphase inductors are commonly configured as two windings on a common core with opposite polarity ends tied together as the common output. A conventional interphase inductor would operate pass signals that are different from each of the inputs, but would block or cancel signals that are common. To that end, the interphase inductor operates to sum the motor excitation signals (namely the currents) from the paralleled inverters 40 and 40' yet suppress common mode circulating currents. In other words a properly designed interphase reactor/inductor 52, 54, 56 will sum up current from each inverter 40 40' and without imposing any voltage drop across it for the fundamental voltage waveform while it prevents current that try to run from one inverter to the other. Although two drives 30 and 30' are shown in FIG. 2, it is understood that embodiments may include more than two drives connected in parallel.

FIG. 3 is a more detailed diagram of the 2 level, 3-phase paralleled drive 20 of an embodiment. Each of the drives 30, 30' includes a passive rectifier bridge 32, 32' having 3 phase input, R, S and T. Each phase leg, R, S and T, is directed to a conventional three phase rectifier bridge 32, 32' to convert AC power from the utility 12 to DC power. The output of the rectifier bridge 32, 32' is directed through a set of coupling reactors that are employed to stabilize/smooth (lower total harmonic distortion) and provide equal sharing of the utility current to the paralleled rectifier bridge 32, 32'. In an embodiment, the coupling reactors are configured as conventional LC circuit with the inductances 42, 42' and 44, 44' in series and the capacitors 46, 46' in parallel on the output of the rectifier bridge 32, 32' respectively. The capacitor 46, 46' is placed across a first DC bus 34 with a positive terminal 36 and a negative terminal 38 and a second DC bus 34' with a positive terminal 36' and a negative terminal 38', respectively. DC bus coupling 48 ties together the positive terminal 36 for the first DC bus 34 with a positive terminal 36' of the second DC 34', while DC bus coupling 49 ties together the negative terminal 38 of the first DC bus 34 with the negative terminal 38' of a second DC bus 34'. In operation, current and voltages will change on the DC bus 34 or 34' as a function of the switching and loading in the inverter 40, 40'. In addition, paralleling the rectifiers 32, 32' and inverters 40, 40' will introduce the potential for circulating currents. The inductors 42, 42', 44, 44' operate with increased impedance to oppose those changes and any circulating currents induced. Likewise, capacitors 46, 46' operates in a conventional manner to oppose any voltage changes on the DC bus 34, 34'. The DC bus coupling 48 and 49 ties the DC busses 34, 34' together. Thereby, the LC circuit in cooperation operates to stabilize the current and voltage and loads of the DC bus 34, 34' and maintain equal sharing of (input) current on each DC bus 34, 34'. It will be appreciated that while the embodiments herein are described with reference to the coupling reactors particularly the series inductors 42, 42', 44, 44', and being placed on the DC side of the rectifiers 32 and 32', they may also be placed on the AC side of the rectifier 32, and 32' between rectifier bridge 32 and 32' and utility source power 12 in the form of conventional 3 phase reactors.

Drive 30 also includes a first inverter 40 having 3 phase legs, W, V, U. Each phase leg, W, V, and U, includes switches controlled by control signals from a drive controller 60 (See FIG. 4) in a conventional manner to convert DC power across the DC bus 34, 36 to AC drive signals to power motor 21, which is part of machine 22 (not shown). Likewise, drive 30' includes a second inverter 40' once again having 3 phase legs, W', V', U'. Each phase leg, W, V, and U, and W', V', and U' includes switches controlled by control signals from at least one drive controller to convert DC power across the DC bus 34-36 and 34'-36' to AC drive signals to power motor 21, which is part of machine 22. The inverters 40, 40' are conventional for motor drives. In an embodiment, the inverters 40, 40' employ at least six switching devices in three separate parallel legs.

Continuing with FIG. 3, the paralleled drive 20 also includes inductive interface 50 with interphase inductors 52, 54, 56 corresponding to the respective phases of the motor 21 (not shown). The interphase inductors 52, 54, 56 combine the inputs to the motor 21 from each of the paralleled inverters 40, 40'. In particular, interphase inductor 52 combines inverter phase output U and U' to form a U command to the motor 21. Interphase inductor 54 combines inverter phase output V and V' to form a V command to the motor 21. Lastly, interphase inductor 56 combines inverter phase output W and W' to form a W command to the motor 21.

Figure 4:
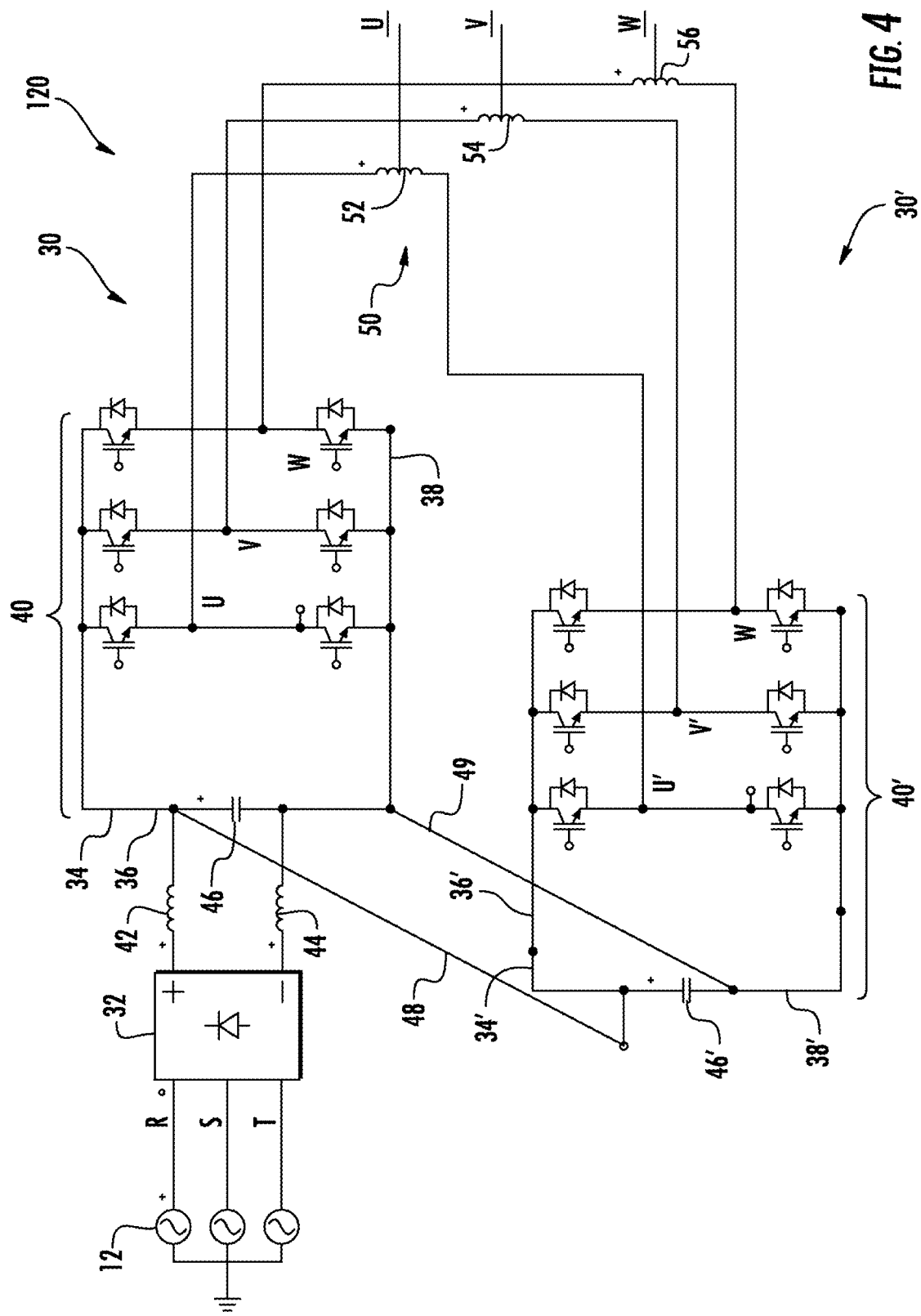
FIG. 4 a simplified schematic of passive rectifier paralleled drive in accordance with an embodiment.

Turning now to FIG. 4 where a detailed diagram of a 2 level, 3-phase paralleled drive 120 of another embodiment is depicted. In this embodiment, the components and configuration are similar to the previous embodiments with the reference numerals increased by 100. Furthermore, where the reference numerals are unchanged, the function and description is the same as identified above with reference to those particular figures. In this embodiment the drive 30, includes a passive rectifier bridge 32, having 3 phase input, R, S and T. Each phase leg, R, S and T, is directed to a conventional three phase rectifier bridge 32 to convert AC power to DC power. In this embodiment, a second rectifier bridge is not employed, instead, the rectifier bridge 32 is employed for both drives 30 and 30'. The output of the rectifier bridge 32 is directed through a set of reactors that are employed to stabilize the current from the paralleled rectifier bridge 32. In an embodiment, the reactors are configured as conventional LC circuit with the inductances 42 and 44 in series and the capacitor 46 in parallel on the output of the rectifier bridge 32 respectively. The capacitor 46 is placed across a first DC bus 34 with a positive terminal 36 and a negative terminal 38. Optionally a second capacitor 46' is placed across a second DC bus 34' with a positive terminal 36' and a negative terminal 38' respectively. DC bus coupling 48 ties together the positive terminal 36 for the first DC bus 34 with a positive terminal 36' of the second DC bus 34', while DC bus coupling 49 ties together the negative terminal 38 of the first DC bus 34' with the negative terminal 38' of a second DC bus 34'. In operation, current and voltages will change on the DC bus 34 or 34' as a function of the switching and loading in the inverter 40, 40'. The inductors 42, 44 operate with increased impedance to oppose those changes. Likewise, and capacitor 46, 46'' operates in a conventional manner to oppose and voltage changes on the DC bus 34, 34'. The DC bus coupling 48 and 49 ties the DC busses 34, 34' together. Thereby, the LC circuit in cooperation operates to stabilize the current and voltage and loads of the DC bus 34, 34'.

Continuing with FIG. 4, as with the earlier embodiments drive 30 also includes a first inverter 40 connected and operating as described above, and likewise, drive 30' includes a second inverter 40' also connected and operating as described above. Paralleled drive 20 also includes inductive interface 50 with interphase inductors 52, 54, 56 corresponding to the respective phases of the motor 21 connected and operating as described above.

Normal PWM

Figure 5:
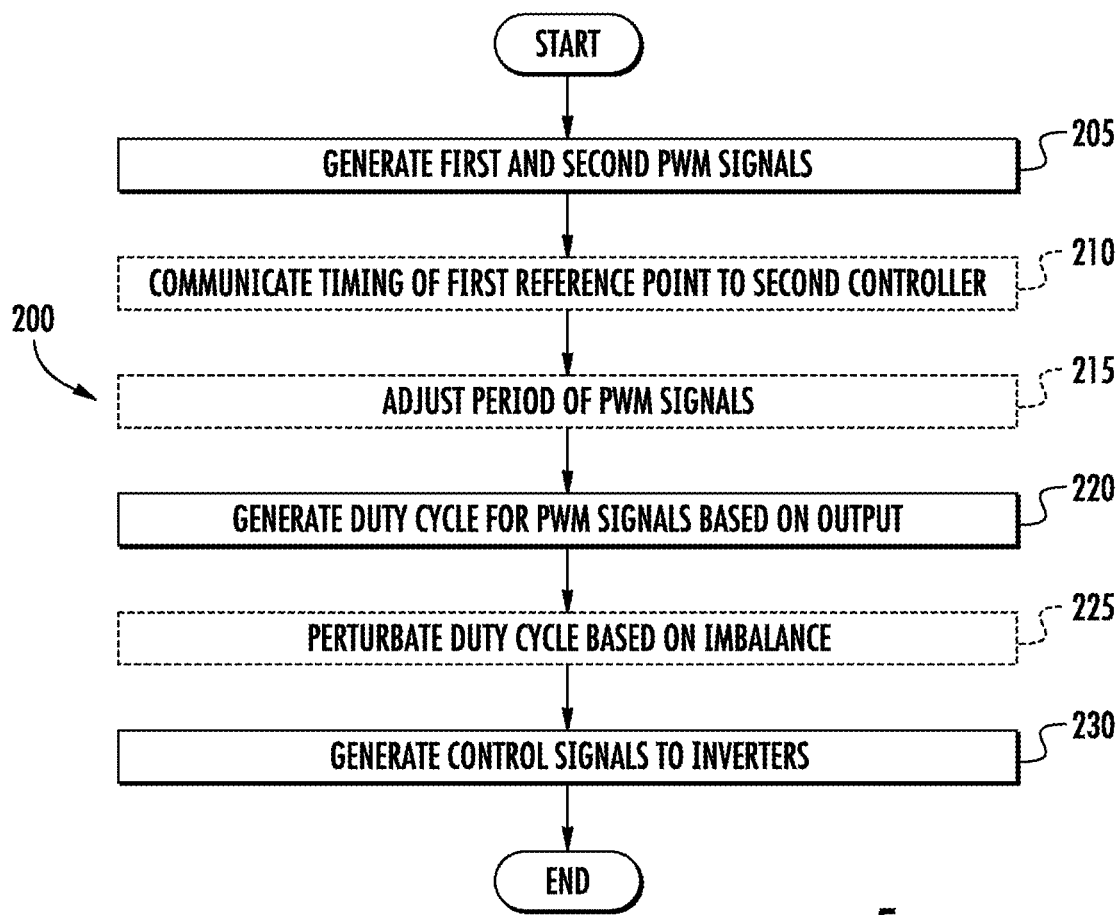
FIG. 5 depicts a method of controlling passive rectifier paralleled drive in accordance with an embodiment.
Figure 6:
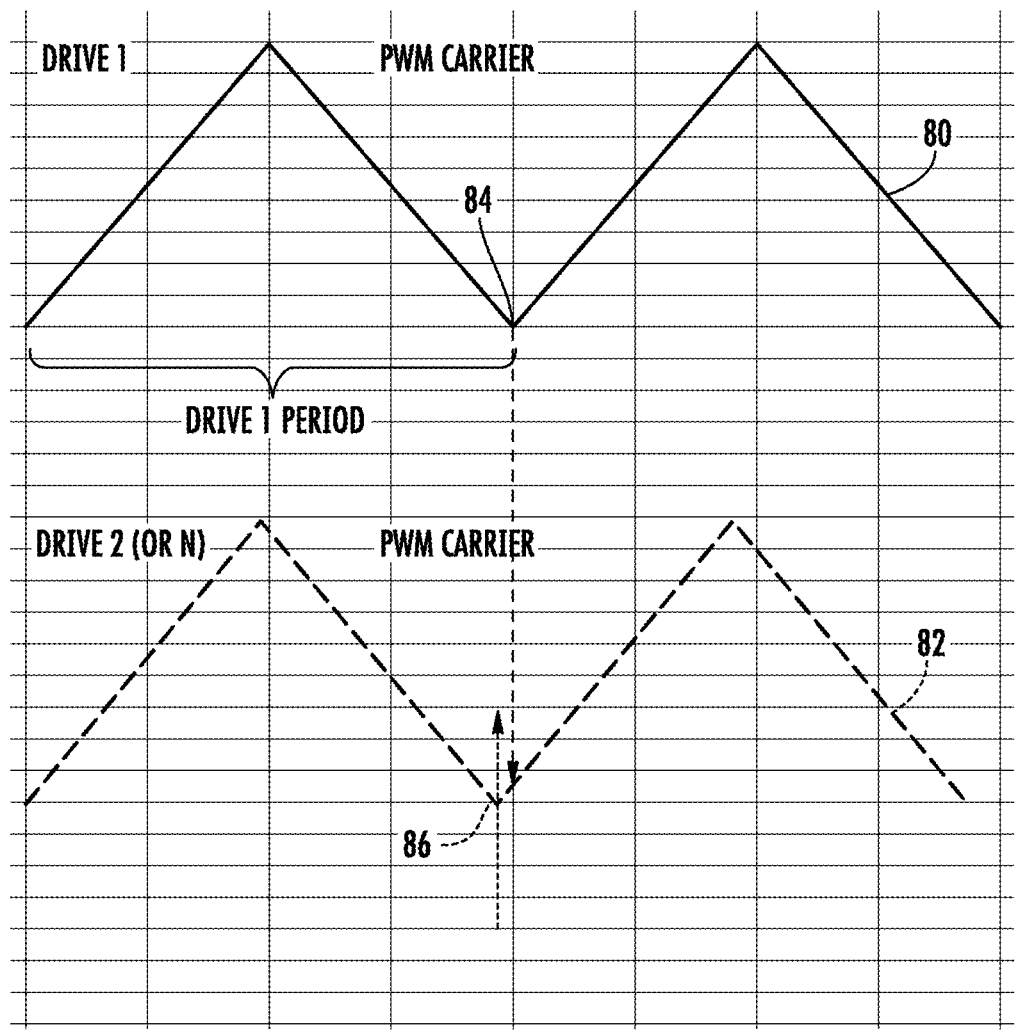
FIG. 6 illustrates a control signal for a passive rectifier paralleled drive in accordance with an embodiment.

Turning now to FIG. 5, where a control methodology 200 for the paralleled drive 20 is depicted. To facilitate combining the drive output signals of separate drives (e.g., 30/30') at the inductive interface 50, it is beneficial that the drive signals at the output of the drives be synchronized. Due to variations in the components, switching devices, drive controllers 60, 60' and inverters 40, 40', using identical control signals may not result in synchronized outputs U, V, and W with U', V', and W' from the drives 30, 30'. In order to aid in synchronizing the outputs from two or more drives e.g., 30, 30', drive controllers 60 and 60' execute a methodology 200 to align the control signals 62, 62' (FIG. 2) provided to the respective drives 30, 30', and in particular the inverters 40, 40'. FIG. 6 depicts a first pulse width modulation (PWM) signal 80 for generating the control signals 62 from drive controller 60 for one phase (e.g., any of U, V, or W) of the inverter 40 of drive 30, for example, and a second PWM signal 82 for generating a second control signal 62' from drive controller 60' (or 64 if a single controller 60 is employed) for one phase (e.g., any of U', V', or W' but corresponding to the PWM signals 80 and 82 above respectively) of the inverter 40' of drive 30', for example. It should be noted, that the control signals 62, 62' are ideally identical and that variations between the control signals 62, 62' are small and designed to address variations in components, timing, and the like. In operation, at process step 205 a reference point 84 of the first PWM signal 80 is defined. As shown in FIG. 5, the reference point 84 is a minimum value of the PWM signal 80, however, any reference point may be used.

During operation, as depicted at process step 210, first drive controller 60 communicates to the second drive controller 60' when the reference point 84 has occurred in PWM signal 80. Second drive controller 60' then determines when the reference point 86 occurs in its PWM signal 82. If there is a difference between when the reference point 84 occurs in the first PWM signal 80 and when the reference point 86 occurs in the second PWM signal 82, then one or both of the drive controllers 60 and 60' may adjust the period of the PWM signals 80, 82 such that the reference points 84, 86 occur at the same time as depicted at process step 215. It should be noted that process steps 210 and 215 are depicted as dashed because they are optional for other embodiments disclosed herein. The first drive controller 60 or second drive controller 60' may use known techniques to adjust the period of the PWM signals 80, 82, such as a phase locked loop technique to reduce error between when the reference points 84 occurs in control signal 80 and when the reference point 86 occurs in control signal 82. This improves synchronization of the control signals 62, 62' between inverters 40 and 40' for drives 30 and 30', which allows smaller inductive elements to be used in inductive interface 50. The control signal synchronization as described may be used with any number of drives, and is not limited to two drives. The control signal synchronization of FIG. 5 may be used with the drives other than those shown in FIG. 3 or 4.

The control signals 62, 62' generated by the controller 60, 60' may be pulse width modulation (PWM) signals, commonly used in n-level drives and many inverter control applications. In conventional PWM, the duty cycle of the control signals 62, 62' is varied as required based on the output current requirements of the load as depicted at process step 220. For example, the desired duty cycle is generated by a motor control demand, commonly a current and speed value. In many applications the speed value dominates the commanded duty cycle while the current value may have a smaller contribution. For example, if more speed or torque is required in by the motor 21, the pulse width of the control signals 62, 62' is increased, thereby the switching devices of the inverter 40, 40' remain on for a commensurate duration and directing more current to the motor 21. Likewise, if a reduction in the speed or output current from the drive 30, 30' is needed, the duty cycle of the control signals 62, 62' is decreased by the controller 60, 60'. Therefore, employing the described techniques, the synchronization between the controllers 60, 60' and the commands to the inverters may be accomplished as depicted at process step 230. In addition, using the duty cycle control with the control signals 62, 62' facilitates accurate control of the motor excitation signals U, V, and W.

Combined Control Single Controller

Continuing with FIG. 5, in another embodiment, an alternative control methodology is described in concert with a different topology for the drive 120. In this embodiment, a single controller (usually a DSP or microcontroller) 60 is employed. In this embodiment because the same controller 60 is generating the control signals 60, 64 for the two inverters 40 and 40' no special synchronization in required (as it is inherent to being generated by the single controller). That is, because the control signals 60, 64 to the inverters 40, 40' are generated in the same controller 60, there are no delays between controllers, in wiring, and the like, and synchronization techniques are not needed. In an embodiment, the controller 60 executes a process similar as described above for the first drive 30 and inverter 40. However, in this instance, controller 60 provides a second set of control signals 64 also from drive controller 60 that are essentially the same as the first. In fact, in an embodiment, they are the same. Once again the control signals 60, 64 may be pulse width modulation signals, commonly used in n-level drives as described in the earlier embodiments.

During operation, the first drive controller 60 may use conventional pulse width modulation techniques to control the duty cycle (on time) of the control signals 60, 64 to the inverters 40 and 40' and thereby the current provided by the inverters 40 and 40'. This technique is very simple because no synchronization is needed or required when the commands for the two inverters 40 and 40' are made from the same controller. However, in this configuration, while simple from controller configuration, it would not address any corrections needed to ensure that inverter 40 and 40' equally share the current load. Unfortunately, then, any imbalance would be uncompensated. In addition, any imbalance would cause the inductive interface 50, and in particular, interphase inductors 52, 54, 56 to carry the additional burden of the imbalance between current outputs of the inverters 40 and 40'. Excessive imbalance could cause the interface inductors 52, 54, 56 to lose their ability to block circulating currents due to core saturation, thus requiring larger inductors to remain effective.

Combined Control Single Controller with Perturbation

To address this consideration and any potential imbalance in the current outputs of the inverter 40 when compared to 40', in an embodiment another methodology for generating the inverter control signals 60, 64 from the controller 60 is disclosed. In this embodiment, similar to the embodiment above, once again a single controller 60 is employed. Once again as described above, conventional PWM duty cycle control technique may be employed to formulate the control signals 60, 64 to the inverters 40 and 40'. In this instance, however, to address the imbalance conditions identified above, beyond the duty cycle required to address the desired operation, a small variation or perturbation to the commanded duty cycle for each of the control signals 60, 64 to the inverters 40 and 40' is introduced as depicted at optional process step 225 of FIG. 5. The amount of perturbation required is small, only sufficient to overcome sharing imbalances between the two drives 40 and 40'. In an embodiment, the perturbation is on the order of <1-2% of the duty cycle for the control signals 60, 64. The variation or perturbation is introduced in a complementary in nature, that is, if for one inverter, e.g. inverter 40, the perturbation is an increase in nominal duty cycle for the control signal 60, for the other inverter e.g., 40' the perturbation is a reduction in duty cycle of the control signal 64. Likewise, if the variation or perturbation for inverter 40 is decrease the nominal duty cycle of the control signal 60, then for the other inverter e.g., 40' the perturbation is an increase duty cycle of the control signal 64. In this manner, any imbalance in the current output of the inverter 40 versus 40' may be reduced or eliminated while maintaining the overall desired duty cycle required and thereby the commanded excitation signals (U, V, and W as well as U', V', W') to the motor 21 to achieve the desired response. Advantageously this approach reduces the impact of current sharing imbalance on the two inverters 40 and 40' and thereby the impact on the interphase inductors 52, 54, and 56. This approach also minimizes the requirements on the interphase inductors 52, 54, and 56 as the net core flux in each under balanced condition is zero and hence core material can be reduced.

Out of Phase

Figure 7:
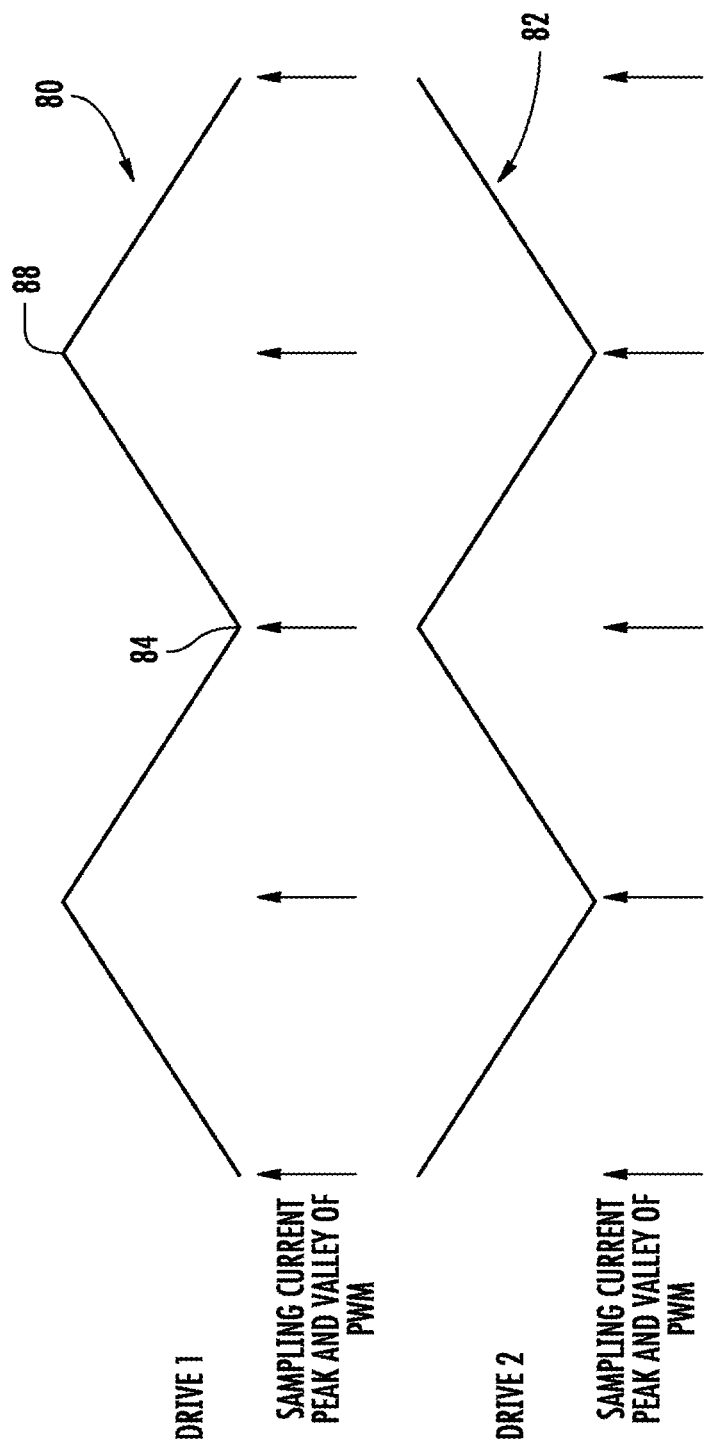
FIG. 7 illustrates a control signal for a passive rectifier paralleled drive in accordance with an embodiment.

Continuing with FIG. 5 and now with references to FIG. 7, in another embodiment, another control methodology is described. To facilitate combining the drive output signals of separate drives (e.g., 30, 30') at the inductive interface 50, once again, it is beneficial that the drive signals at the output of the drives be synchronized to minimize the required inductive interface. It will be appreciated as mentioned above that there are many reasons that despite employing identical commands, the control signals 60, and 62 to the inverters 40 and 40' may not be synchronized. In an embodiment in order to aid in synchronizing the outputs from two or more drives e.g., 30, 30', drive controllers 60 and 60' execute another process similar to that described above to align, the control signals 60, and 62 provided to the respective drives 30, 30', and in particular the inverters 40, 40'. FIG. 7 depicts one period of a first PWM signal 80 from drive controller 60 for one phase (e.g., any of U, V, or W) of the inverter 40 of drive 30 just as described for earlier embodiments. Once again second PWM signal 82 from drive controller 60' (or 64 if a single controller 60 is employed) for one phase (e.g., any of U', V', or W' but corresponding to the PWM signal 80 above) of the inverter 40' of drive 30' is depicted. However, in this embodiment, it should be noted that the second PWM signal 82 is defined to be 180 degrees out of phase with the first control signal 80. The PWM signals 80, 82 may be pulse width modulation signals, commonly used in n-level drives.

In operation, once again a first reference point 84 of the first PWM signal 80 is defined, similar as to the embodiment described above. As shown in FIG. 7, the first reference point 84 is a minimum value of the PWM signal 80, however, any reference point may be used. In addition, a second reference point 88 is selected. Once again, while a maximum point in the control signal 80 is selected and depicted in the figure, almost any other point could be selected. For simplicity, in processing a maximum, 90 degrees following the first reference point 84 (a minimum) is selected for the second reference point 88. Similar to that described above, during operation, first drive controller 60 communicates to the second drive controller 60' when the first reference point 84 and the second reference point 88 have occurred in the PWM signal 80. Second drive controller 60' then determines when the first reference point 84 and second reference point 88 occurs in its PWM signal 82. If there is a difference, accounting for the 180 degree shift between when the two reference points 84, 86 occur in the first PWM signal 80 and when the two reference points 84, 86 occurs in the second PWM signal 82, then one or both of the drive controllers 60 and 60' may adjust the period of the PWM signals 80 or 82 (and thereby the control signals 60, 62) respectively such that the reference points 84, 86 of the respective PWM signals 80, 82 occur at the same time.

The first drive controller 60 or second drive controller 60' may use known techniques to adjust the period of the drive signal 80, 82, such as a phase locked loop technique to reduce error between when the reference point occurs in PWM signal 80 and when the reference point occurs in PWM signal 82. This improves synchronization of the control signals 60, 62 between inverters 40 and 40' for drives 30 and 30', albeit with the phase difference mentioned above. When synchronized in accordance with this embodiment it allows for less burden and the potential for smaller rectifiers, to be used in the rectifier bridge 32, 32'. In addition, it facilitates a reduced burden on the DC bus 32, 32' and reactances 42, 44, and 46 as none or less of the switching devices of the inverters 40, 40' are demanding current at the same time. That is, that that the control signals 62, 62' are interleaved such that one drives demands are offset from the others. In addition, it would readily facilitate the elimination of the second rectifier bridge 32' and reactances 42', 44' as described in an earlier embodiment. An additional advantageous feature of the interleaving control methodology described is that due to the 180 degree shift of the second control signal 86. The apparent frequency of noise, switching, ripple applied to the interphase inductances 52, 54, and 56 and the motor 21 is doubled. As a result, the size the interphase inductors 52, 54, and 56 may be reduced. Alternatively, because of the apparent frequency doubling if the interphase inductances 52, 54, and 56 are maintained at the same size, the frequency of the PWM may be reduced to half. Moreover, the PWM frequency doubling has an additional benefit as it reduces acoustic impact on users. The human ear is less sensitive to higher frequency and the amplitude is reduced by half. Reducing the PWM frequency reduces the switching losses in the switching devices of the inverter 40, 40' depending on the configuration of the drive, the switching losses can be 30 percent of the losses in the switching devices. The control signals 60, 62 synchronization as described may be used with any number of drives, and is not limited to two drives. The control signal 60, 62 synchronization of FIG. 7 may be used with the drives other than those shown in FIG. 3 or 4.

Out of Phase & Single Controller

In yet another embodiment, another control methodology is described. Once again, to facilitate combining the drive output signals of separate drives (e.g., 30/30') at the inductive interface 50, once again, it is beneficial that the drive signals at the output of the drives be synchronized. In this embodiment, once again a single controller 60 is employed as described above. In this embodiment because the same controller 60 is generating the control signals 60, 64 for the two inverters 40 and 40' no special synchronization in required. That is, because the control signals 60, 64 to the inverters 40, 40' are generated in the same controller 60, there are no delays between controllers 60, 60', in wiring, and the like, and synchronization techniques are not needed.

In an embodiment, the controller 60 executes a process similar as described above for the first drive 30 and inverter 40. However, in this instance, controller 60 provides a second set of control signals 64 also from drive controller 60 that are essentially the same as the first. In this embodiment, it should be noted that the second set control signals 64 is defined to be 180 degrees out of phase with the first control signals 62 as described for the interleaving control methodology of the embodiments above. In this instance then using a single controller 60 the synchronization of the control signals between inverters 40 and 40' for drives 30 and 30' is controlled, albeit with the phase difference mentioned above. When synchronized and interleaved in accordance with this embodiment the advantages described above may be realized including allowing for less burden in the rectifier bridge 32, 32', less burden on the DC bus 32, 32' and reactances 42, 44, and 46. In addition, it would readily facilitate the elimination of the second rectifier bridge 32' and reactances 42', 44' as described in an earlier embodiment. An additional advantageous feature of the control methodology described is that due to the 180 degree shift, the apparent frequency doubling permits reducing the size the interphase inductors or alternatively reducing the switching frequency of the PWM to reduce the switching losses in the switching devices of the inverter 40, 40' as described earlier.

Figure 8:
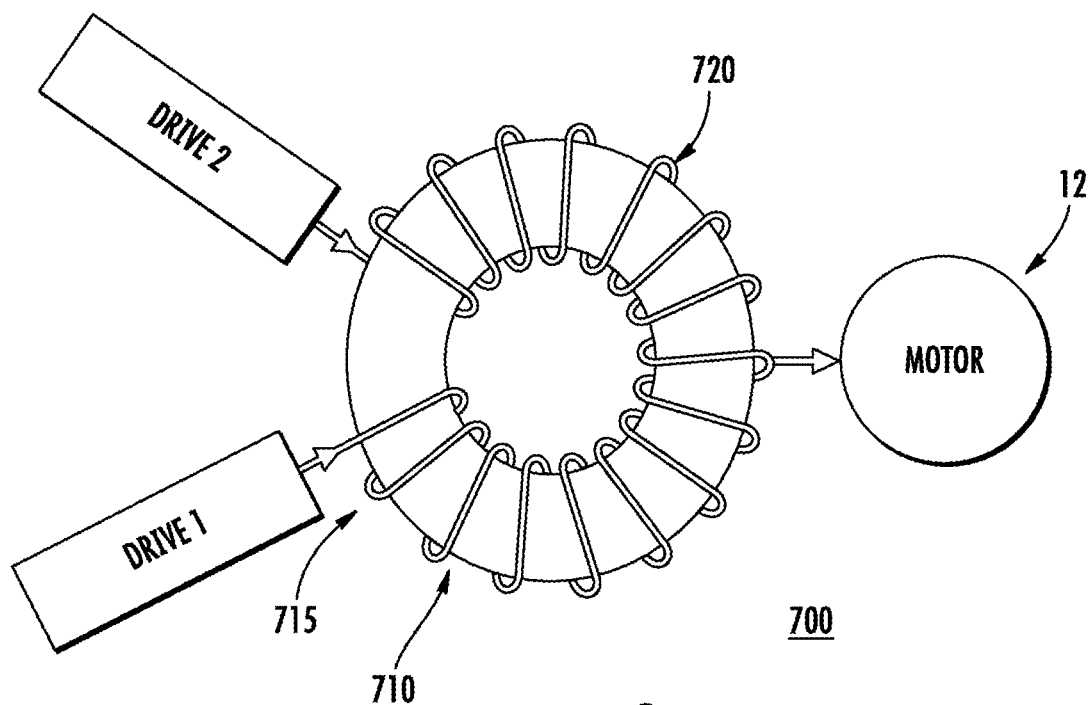
FIG. 8 depicts a coupling inductor structure in accordance with an embodiment.

FIG. 8 shows the interphase inductor physical structure 700 that includes, but is not limited to, a toroidal core 710. Two equivalent windings 715, 720 with inversed directions are employed with their common point tied to a phase of the motor 12, ideally summing the outputs of the two drive inputs. The interphase inductor flux is generated by the current that goes through both branches, creating canceling flux in the core to benefit minimal voltage drop for fundamental voltage, while the inductance from one drive to the other drive remains to limit the circulating current. Therefore, by controlling equal currents from the drives and by the benefit of interphase inductor the size and also the voltage drop that it could incur in case the currents are not balanced is minimized. It should be appreciated that the actual design of the coupling inductor will most likely still result in some leakage inductance from each drive to the motor. This residual leakage inductance will also function to provide motor surge voltage suppression.

Embodiments include the use of paralleled drives in order to meet high load demands without the need to design or source a single, high power drive. Using parallel drives with passive rectifiers and the control methodologies described herein, allows the drive system to meet load demands through multiple, lower power drives. This eliminates the cost and/or development time associated with a single, higher power drive.

In view of the above, the technical effects and benefits of embodiments of a rectifier system include achieving reduced CM-voltage that enables control capability of the DC-link voltage for passive front-end rectifier system. Eliminating common-mode voltage for the inverter output results in significant reductions of CM EMI noise, and eliminating a need for CM EMI filters, along with a reduction of an input current ripple, DC side (e.g., DC capacitor) current ripple, and a conducted EMI. Further, the technical effects and benefits of embodiments can include balancing in each switching cycle output voltages for two paralleled rectifiers and a circulating current.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A three-phase paralleled passive front-end drive, comprising:
a first rectifier bridge configured for connection to a three phase alternating current power source;
a first coupling reactance operably connected to the rectifier bridge and configured to transfer power from the rectifier to a first direct current (DC) bus;
a second rectifier bridge configured for connection to a three phase alternating current power source;
second coupling reactance operably connected to the second rectifier bridge and configured to transfer power from the rectifier bridge to a second direct current (DC) bus
a bus coupler operably coupling the first DC bus to a second DC bus;
a first inverter operably connected to the first DC bus;
a second inverter operably connected the second DC bus, the first inverter and second the inverter each configured to provide a plurality of motor excitation signals;
a first controller operably connected to the first inverter and the second inverter, the controller configured to generate control signals to cause the first inverter and the second inverter to generate a plurality of motor excitation signals respectively;

a plurality of interphase inductors operable to combine the plurality of motor excitation signals from the first inverter with the plurality of motor excitation signals from the second inverter;

a second controller wherein the first controller and the second controller implement a method to cause the first inverter and the second inverter to provide substantially equal motor excitation currents respectively.

2. The three-phase paralleled passive front-end drive of claim 1, wherein at least one of the first coupling reactance and the second coupling reactance includes two series inductors and a parallel capacitor to stabilize the first DC bus and second DC bus respectively.

3. The three-phase paralleled passive front-end drive of claim 1, wherein:

the first controller generates a first pulse width modulation (PWM) reference signal and the second controller generates a second PWM reference signal;

the first controller and the second controller each generate a duty cycle for the control signals based on the first PWM reference signal and second PWM reference signals respectively, the first controller generates a first set of control signals to the first inverter and the second controller generates a second set of control signals to the second inverter based on the first PWM reference signal and second PWM reference signals respectively.

4. The three-phase paralleled passive front-end drive of claim 3, further including the first controller communicating timing of a reference point on the first reference to the second controller, the second controller adjusting a period of its PWM reference signal based on the timing.

5. The three-phase paralleled passive front-end drive of claim 4, further including at least one of the first controller and the second controller perturbating a duty cycle of at least one of the first set of control signals and the second set of control signals based on at least one of the first PWM reference signal and second PWM reference signals.

6. The three-phase paralleled passive front-end drive of claim 3, wherein the second PWM reference signal is 180 degrees out of phase from the first pulse width modulation (PWM) reference signal.

7. The three-phase paralleled passive front-end drive of claim 1, wherein the first or the second coupling reactance is configured to control a circulation current of the three-phase paralleled passive front-end drive.

8. The three-phase paralleled passive front-end drive of claim 1, wherein the first inverter and the second inverter comprise at least six switching devices.

9. The three-phase paralleled passive front-end drive of claim 1, wherein each interphase inductor includes a pair of windings and is configured to control a circulation current of the three-phase paralleled passive front-end drive.

10. The three-phase paralleled passive front-end drive of claim 1, wherein the first controller is configured to implement a method to cause the first inverter and the second inverter to provide substantially equal motor excitation currents respectively.

11. The three-phase paralleled passive front-end drive of claim 10 wherein, the first controller generates a first pulse width modulation (PWM) reference signal and a second PWM reference signal;

the first controller generates a first set of control signals to the first inverter and a second set of control signals to the second inverter based on the first PWM reference signal and second PWM reference signals respectively.

12. The three-phase paralleled passive front-end drive of claim 11, further including perturbating a duty cycle of at least one of the first set of control signals and the second set of control signals based on at least one of the first PWM reference signal and second PWM reference signals.

13. The method of controlling a three-phase paralleled passive front-end drive of claim 11, wherein the second PWM reference signal is 180 degrees out of phase from the first pulse width modulation (PWM) reference signal.

14. A motor control system with a three-phase paralleled passive front-end drive, comprising:

a first rectifier bridge configured for connection to a three phase alternating current power source;

a first coupling reactance operably connected to the rectifier bridge and configured to transfer power from the rectifier to a first direct current (DC) bus;

a second rectifier bridge configured for connection to a three phase alternating current power source;

second coupling reactance operably connected to the second rectifier bridge and configured to transfer power from the rectifier bridge to a second direct current (DC) bus a bus coupler operably coupling the first DC bus to a second DC bus;

a first inverter operably connected to the first DC bus;

a second inverter operably connected the second DC bus, the first inverter and second the inverter each configured to provide a plurality of motor excitation signals;

a first controller operably connected to the first inverter and the second inverter, the controller configured to generate control signals to cause the first inverter and the second inverter to generate a plurality of motor excitation signals respectively; and a plurality of interphase inductors operable to combine the plurality of motor excitation signals from the first inverter with the plurality of motor excitation signals from the second inverter to form a plurality of combined motor excitation signals;

a motor operably connected to the plurality of interphase inductors, the motor configured to receive the plurality of combined motor excitation signals;

a second controller wherein the first controller and the second controller implement a method to cause the first inverter and the second inverter to provide substantially equal motor excitation currents respectively.

15. The motor control system of claim 14, wherein at least one of the first coupling reactance and the second coupling reactance includes two series inductors and a parallel capacitor to at least one of; stabilize the first DC bus, stabilize the second DC bus, and control a circulation current of the three-phase paralleled passive front-end drive respectively.

16. The motor control system of claim 14, wherein each interphase inductor includes a pair of windings and is configured to control a circulation current of the three-phase paralleled passive front-end drive.

17. The motor control system of claim 14, wherein the controller is configured to implement a method to cause the first inverter and the second inverter to provide substantially equal motor excitation currents respectively.

18. A building system having motor control system with a three-phase paralleled passive front-end drive, comprising:

a rectifier bridge configured for connection to a three phase alternating current power source;

a coupling reactance operably connected to the rectifier bridge and configured to transfer power from the rectifier to a first direct current (DC) bus;

a bus coupler operably coupling the first DC bus to a second DC bus;

a first inverter operably connected to the first DC bus;

a second inverter operably connected the second DC bus, the first inverter and second the inverter each configured to provide a plurality of motor excitation signals;

a first controller operably connected to the first inverter and the second inverter, the controller configured to generate control signals to cause the first inverter and the second inverter to generate a plurality of motor excitation signals respectively;

a plurality of interphase inductors operable to combine the plurality of motor excitation signals from the first inverter with the plurality of motor excitation signals from the second inverter to form a plurality of combined motor excitation signals;

a motor operably connected to the plurality of interphase inductors, the motor configured to receive the plurality of combined motor excitation signals from the interphase inductors, wherein the motor is operatively coupled to a drive element of the building system;

a second controller wherein the first controller and the second controller implement a method to cause the first inverter and the second inverter to provide substantially equal motor excitation currents respectively.

\* \* \* \* \*